United States Patent
Hong et al.

(10) Patent No.: US 12,415,446 B2
(45) Date of Patent: Sep. 16, 2025

(54) TETHER ANCHOR OF SEATBACK OF VEHICLE SEAT

(71) Applicants: Hyundai Motor Company, Seoul (KR); Kia Corporation, Seoul (KR)

(72) Inventors: Suk Won Hong, Gyeonggi-do (KR); Sang Hyeok Yun, Gyeonggi-do (KR); Seon Hyeok Lee, Gyeonggi-do (KR); Seung Hyun Kim, Daejeon (KR); Seok Hwan Kim, Gyeonggi-do (KR); Gil Ju Kim, Gyeonggi-do (KR); Kyu Seok Kim, Gyeonggi-do (KR); Bo Youn Seo, Gyeongg-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 184 days.

(21) Appl. No.: 18/375,733

(22) Filed: Oct. 2, 2023

(65) Prior Publication Data
US 2024/0391367 A1 Nov. 28, 2024

(30) Foreign Application Priority Data
May 22, 2023 (KR) .................. 10-2023-0065685

(51) Int. Cl.
*B60N 2/60* (2006.01)
*B60N 2/28* (2006.01)

(52) U.S. Cl.
CPC ......... *B60N 2/2893* (2013.01); *B60N 2/2809* (2013.01); *B60N 2/6009* (2013.01)

(58) Field of Classification Search
CPC ... B60N 2/2893; B60N 2/2809; B60N 2/6009
See application file for complete search history.

(56) References Cited

U.S. PATENT DOCUMENTS

| | | | | |
|---|---|---|---|---|
| 9,738,183 B2* | 8/2017 | Szlag | .................... | B60N 2/2893 |
| 10,232,750 B2* | 3/2019 | Hamano | ................ | B60N 2/688 |
| 10,960,791 B1* | 3/2021 | Skinner | ................ | B60N 2/2893 |
| 11,046,216 B2* | 6/2021 | Parmar | ................ | B60N 2/2893 |
| 11,325,507 B2* | 5/2022 | Kang | .................... | B60N 2/2816 |
| 11,667,220 B2* | 6/2023 | Onji | ..................... | B60N 2/2887 297/253 |
| 11,679,727 B2* | 6/2023 | Anderson | ............ | B60N 2/2809 296/1.08 |
| 11,760,239 B2* | 9/2023 | Weber | .................. | B60N 2/6009 297/250.1 |

(Continued)

FOREIGN PATENT DOCUMENTS

| | | | | |
|---|---|---|---|---|
| CN | 108177567 A | * | 6/2018 | ........... B60N 2/2893 |
| KR | 10-2018-0024797 A | | 3/2018 | |
| WO | WO-2020169447 A1 | * | 8/2020 | ........... B60N 2/2887 |

*Primary Examiner* — Syed A Islam
(74) *Attorney, Agent, or Firm* — Fox Rothschild LLP

(57) ABSTRACT

A tether anchor of a seatback of a vehicle seat includes a first wire fixed in at least a first end of the first wire to a seatback frame and forming a cover mounting part for fixing a cover, a second wire fixed at both ends of the second wire to the seatback frame and forming an anchor part for fixing a top tether of a car seat while crossing the cover mounting part of the first wire, and a cover mounted on the cover mounting part. The cover may be mounted on the cover mounting part so as to expose the anchor part to a rear of the seatback, and to seal the rear of the seatback.

20 Claims, 10 Drawing Sheets

(56) References Cited

U.S. PATENT DOCUMENTS

| | | | |
|---|---|---|---|
| 12,269,379 B2* | 4/2025 | Tomioka | B60N 2/6009 |
| 2023/0145513 A1* | 5/2023 | Hong | B60N 2/6009 297/250.1 |

* cited by examiner

TETHER ANCHOR OF SEATBACK OF VEHICLE SEAT

CROSS REFERENCE TO RELATED APPLICATION(S)

The present application claims under 35 U.S.C. § 119(a) the benefit of Korean Patent Application No. 10-2023-0065685, filed May 22, 2023, the entire contents of which are incorporated by reference herein.

BACKGROUND

1. Technical Field

The present disclosure relates to a tether anchor of a seatback of a vehicle seat, more particularly, to the tether anchor configured to anchor a top tether for holding a car seat to the seatback of the vehicle seat.

2. Description of the Related Art

Since a seat and a safety belt provided in a vehicle are generally designed for an adult, it is difficult to adequately protect an infant or a small child in the event of a vehicle accident.

Thus, an infant or a small child typically must be seated in a car seat that is separately installed in the vehicle to enable more appropriate protection.

Since the car seat should be firmly fixed inside the vehicle, a tether anchor is provided on a seatback of a vehicle seat of the vehicle to fix a top tether connected to an upper side of the car seat.

The description provided above as a related art of the present disclosure is for helping to understand the background of the present disclosure and should not be construed as being included in the related art known by those skilled in the art.

SUMMARY

An objective of the present disclosure is to provide a tether anchor of a seatback for a vehicle, which can firmly form the tether anchor on the seatback of a vehicle seat with a relatively simple configuration, thus being capable of exhibiting required robust support performance while minimizing the number of components, assembly process, and cost required for forming the tether anchor.

In order to achieve the objective of the present disclosure, there is provided a tether anchor of a seatback, including a first wire fixed in at least a first end thereof to a seatback frame and forming a cover mounting part for fixing a cover, a second wire fixed at both ends thereof to the seatback frame and forming an anchor part for fixing a top tether of a car seat while crossing the cover mounting part of the first wire, and a cover mounted on the cover mounting part.

The cover may be mounted on the cover mounting part so as to expose the anchor part to a rear of the seatback.

The cover may be configured to seal the rear of the seatback.

The cover mounting part of the first wire may form a closed curve.

The anchor part of the second wire may be formed by a straight portion that crosses a central portion of the cover mounting part forming the closed curve.

The second wire may include, on both ends of the straight portion forming the anchor part, middle bending portions that extend along a periphery of the cover mounting part, and the middle bending portion may be spaced apart from the cover mounting part.

The closed curve forming the cover mounting part of the first wire may include on upper, lower, left, and right sides thereof straight sections to which the cover is coupled.

The cover may include, on an outside of a pocket portion inserted into the cover mounting part, a plurality of locking ribs that are caught by the cover mounting part, and may include, on a central portion of the pocket portion, an anchor insert portion into which the anchor part of the second wire is inserted.

Some of the locking ribs formed on the pocket portion of the cover may be formed on cantilever-shaped elastic pieces that are integrally connected at first ends thereof to the pocket portion, so as to be elastically deformed into the pocket portion when the cover is mounted on the cover mounting part.

The first wire may be fixed at a lower end thereof to the seatback frame.

Both upper and lower ends of the first wire may be fixed to the seatback frame.

The cover mounting part of the first wire may be formed in a shape of an inverted U, and both ends of the inverted U shape may be fixed to the seatback frame.

A vehicle seat may include the tether anchor.

A vehicle may include the tether anchor.

Further, in order to achieve the objective of the present disclosure, there is provided a tether anchor of a seatback, including a first wire forming a cover mounting part surrounded by at least three sides among four sides forming a closed curve and fixed in at least a first end thereof to the seatback frame, a second wire including an anchor part crossing the cover mounting part and fixed at both ends thereof to the seatback frame, and a cover mounted on the cover mounting part.

The cover may be configured to seal the cover mounting part to prevent the cover mounting part from being exposed to an outside of the seatback, so as to expose the anchor part.

The first wire may be vertically installed on the seatback frame, and be fixed in at least a lower end thereof to the seatback frame. The second wire may be horizontally installed on the seatback frame, and both ends thereof may be fixed to both sides of the seatback frame, respectively.

A pocket portion inserted into the cover mounting part may be formed in a central portion of the cover, a flange portion may be formed along an outer edge of the pocket portion to surround a rear of the cover mounting part, a plurality of locking ribs may be provided on an outer surface of the pocket portion to be secured to the cover mounting part, and an anchor insert portion may be formed in a central portion of the pocket portion so that the anchor part of the second wire is inserted therein.

At least some of the locking ribs provided on the pocket portion of the cover may be formed on cantilever-shaped elastic pieces that are integrally connected at first ends thereof to the pocket portion, so as to be elastically deformed into the pocket portion when the cover is mounted on the cover mounting part.

The second wire may include, on both ends of a straight portion forming the anchor part, middle bending portions that extend downwards while being spaced apart from a periphery of the cover mounting part.

The present disclosure is advantageous in that a tether anchor can be firmly formed on a seatback of a vehicle seat with a relatively simple configuration, thus being capable of exhibiting required robust support performance while minimizing the number of components, assembly process, and cost required for forming the tether anchor, and thereby significantly contributing to improving the safety of an infant or a child when riding in the vehicle.

DETAILED DESCRIPTION

Figure 1:
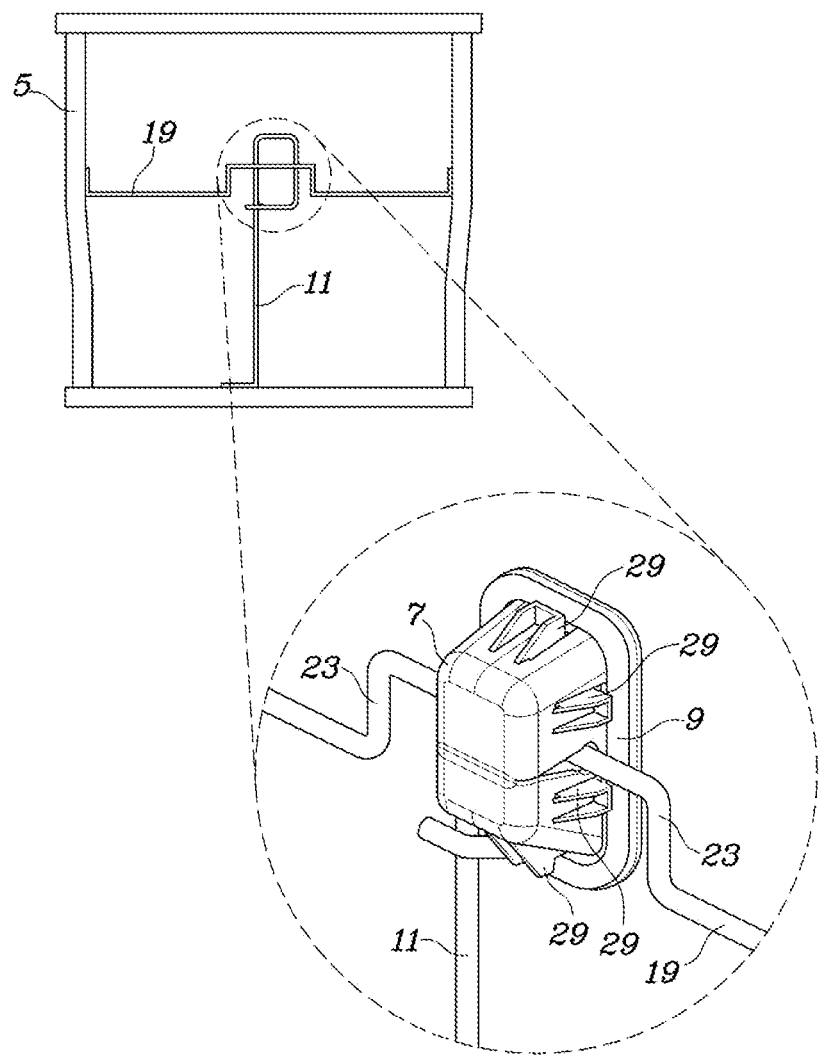
FIG. 1 is a view illustrating a tether anchor of a seatback according to a first embodiment of the present disclosure.
Figure 2:
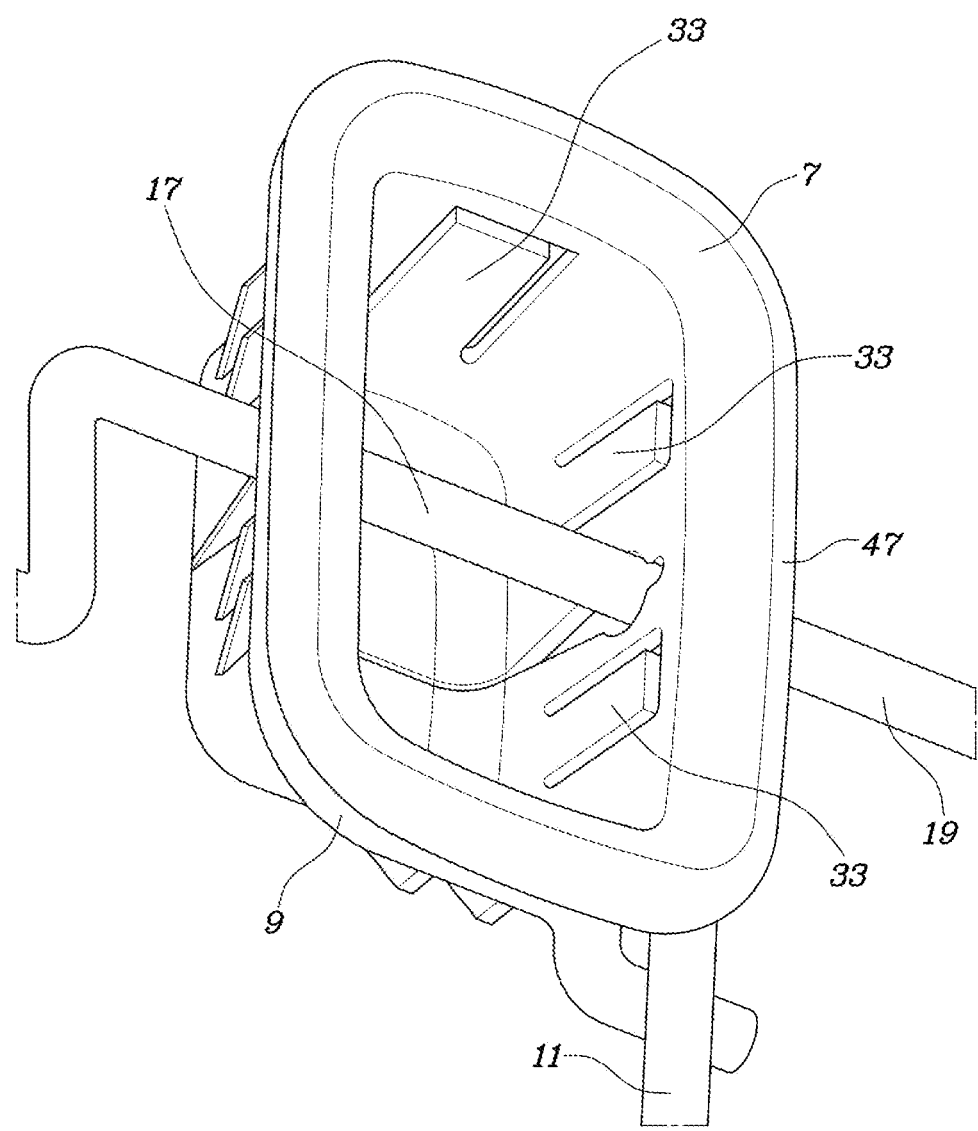
FIG. 2 is a view illustrating an opposite side of FIG. 1.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereafter, embodiments of the present disclosure will be described in detail with reference to the accompanying drawings and the same or similar components are given the same reference numerals regardless of the numbers of figures and are not repeatedly described.

In the following description, if it is decided that the detailed description of known technologies related to the present disclosure makes the subject matter of the embodiments described herein unclear, the detailed description is omitted. Further, the accompanying drawings are provided only for easy understanding of embodiments disclosed in the specification, and the technical spirit disclosed in the specification is not limited by the accompanying drawings, and all changes, equivalents, and replacements should be understood as being included in the spirit and scope of the present disclosure.

Terms including ordinal numbers such as "first", "second", etc. may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween. On the other hand, it should be understood that when one element is referred to as being "connected directly to" or "coupled directly to" another element, it may be connected to or coupled to another element without the other element intervening therebetween.

Singular forms are intended to include plural forms unless the context clearly indicates otherwise.

Referring to FIGS. 1 to 10, a tether anchor 3 of a seatback 1 according to embodiments of the present disclosure includes a first wire 11 that is fixed in at least one end thereof to a seatback frame 5 and forms a cover mounting part 9 for fixing a cover 7, a second wire 19 that is fixed at both ends thereof to the seatback frame 5 and forms an anchor part 17 for fixing a top tether 15 of a car seat 13 while crossing the cover mounting part 9 of the first wire 11, and a cover 7 that is mounted on the cover mounting part 9 while exposing the anchor part 17 to a rear of the seatback 1, thus sealing the rear of the seatback 1.

That is, the tether anchor 3 of the present disclosure seals the first wire 11 that provides the cover mounting part 9, the second wire 19 that provides the anchor part 17, and the cover mounting part 9 to define an external appearance, while the anchor part 17 is formed by the cover 7 to be exposed to the rear of the seatback 1.

As such, the tether anchor 3 of the present disclosure can provide a sufficient support force that the tether anchor 3 is to provide, while requiring a very small number of components, thus allowing an infant or a child sitting on the car seat 13 to be effectively protected.

FIGS. 1 to 8 show a first embodiment of the present disclosure. Here, the cover mounting part 9 of the first wire 11 forms a closed curve.

Figure 9:
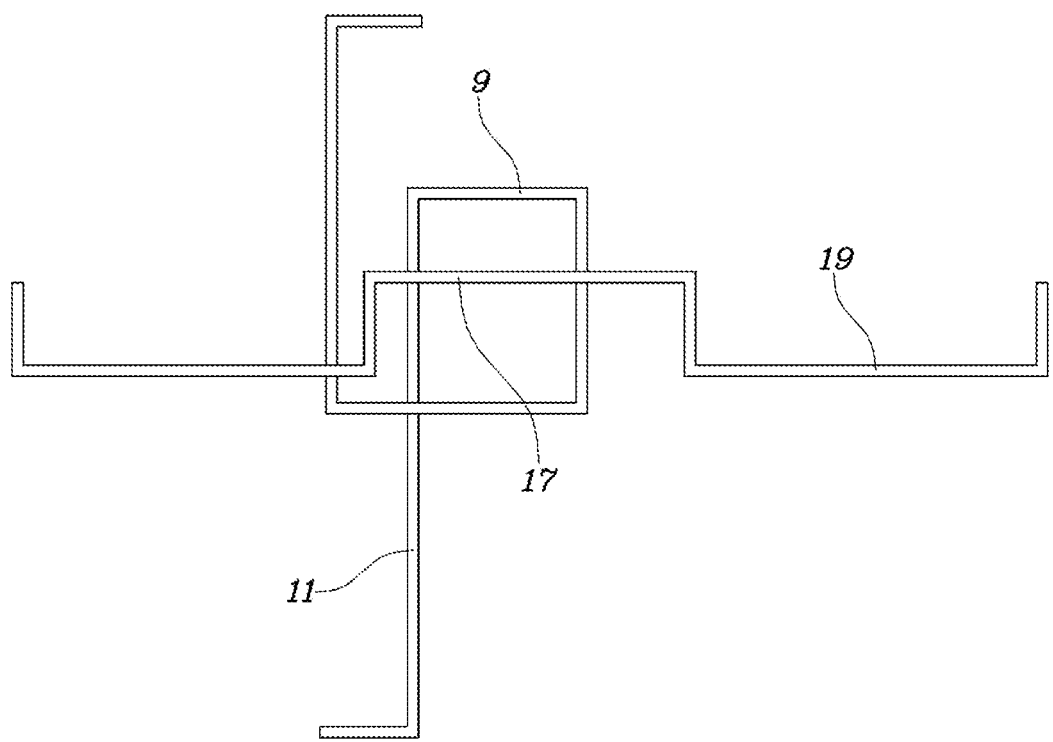
FIG. 9 is a view illustrating a tether anchor of a seatback according to a second embodiment of the present disclosure.

For reference, according to a second embodiment of FIG. 9, the cover mounting part 9 of the first wire 11 also forms a closed curve. However, the second embodiment is different from the first embodiment in that the upper end as well as the lower end of the first wire 11 is secured to the seatback frame 5.

Figure 10:
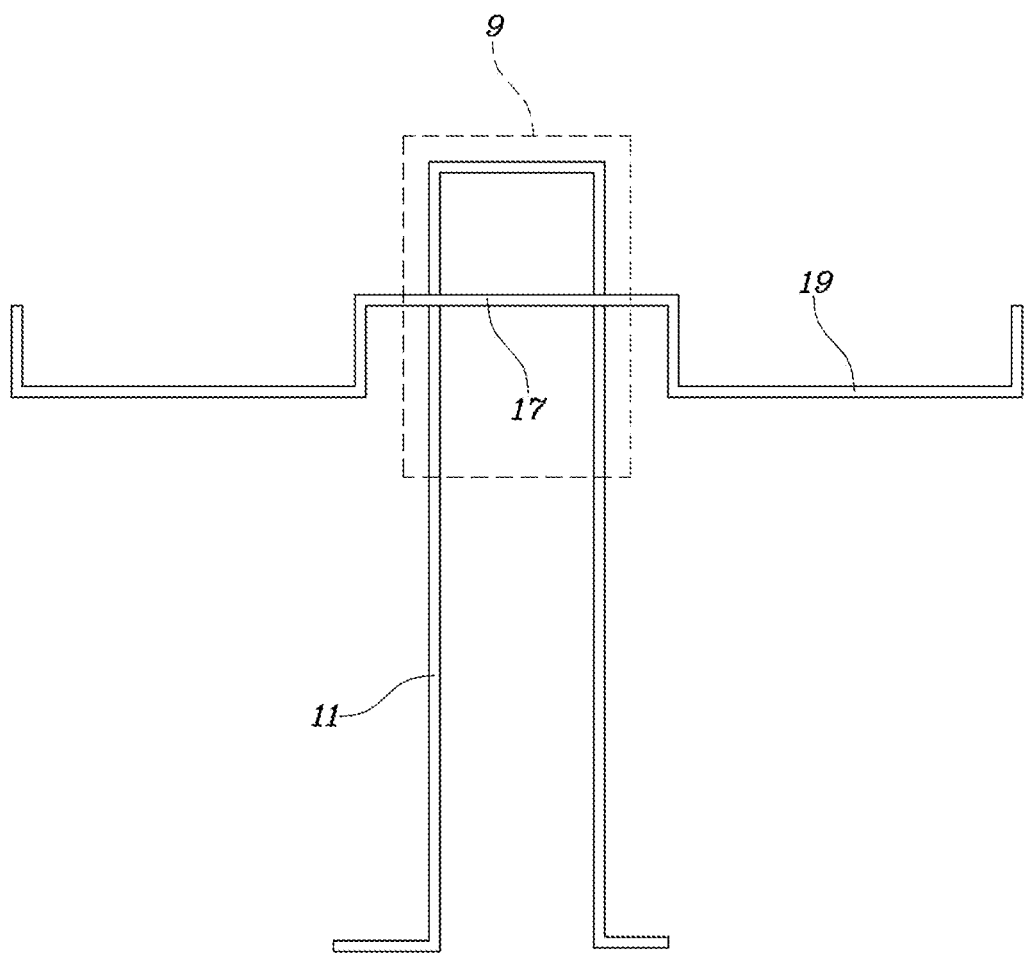
FIG. 10 is a view illustrating a tether anchor of a seatback according to a third embodiment of the present disclosure.

On the other hand, a third embodiment of FIG. 10 is different from both the preceding embodiments in that the cover mounting part 9 of the first wire 11 does not form a closed curve, but is formed in an inverted U-shape with an open lower side, and both ends of the inverted U-shape are fixed to the lower side of the seatback frame 5.

The anchor part 17 of the second wire 19 is formed by a straight portion 21 that crosses the central portion of the cover mounting part 9 forming the closed curve.

Figure 7:
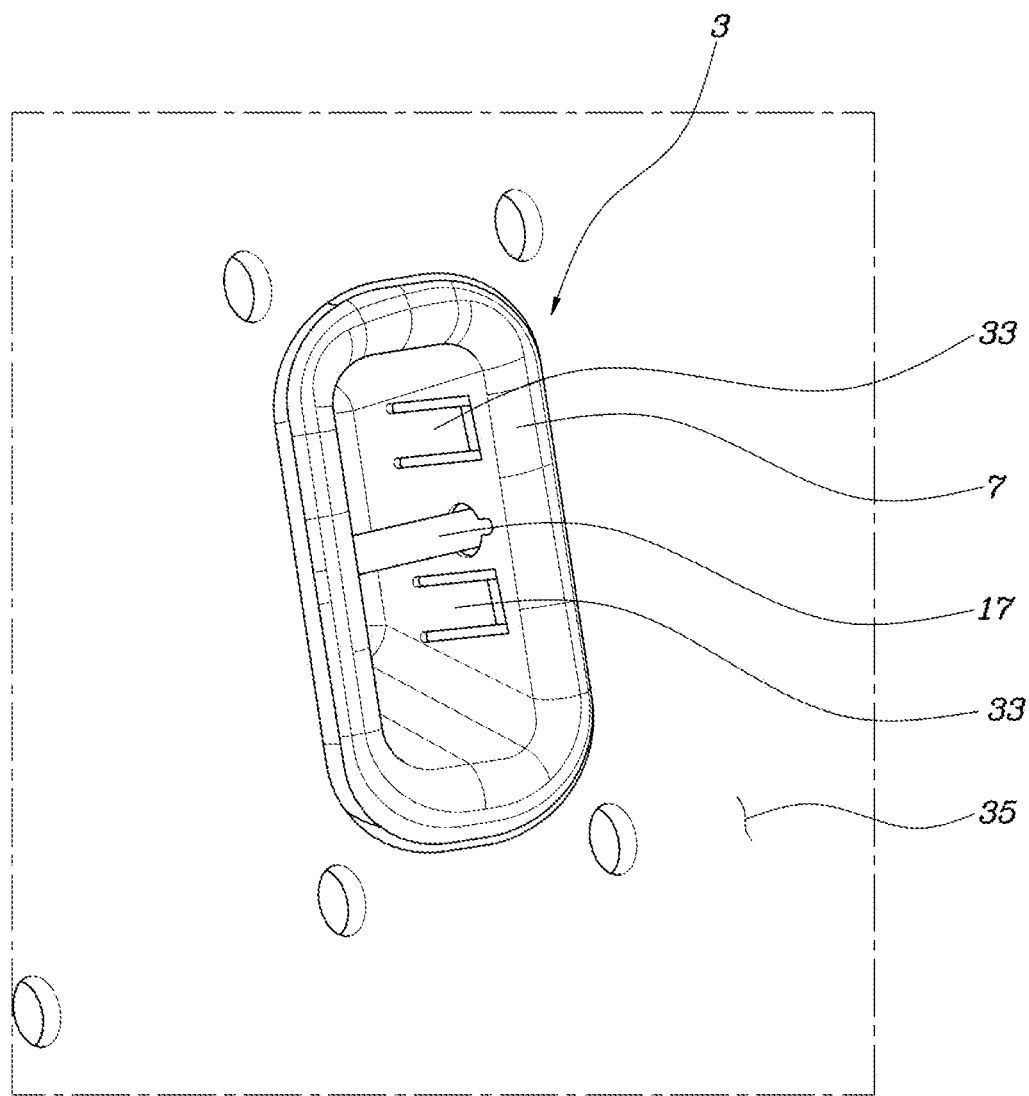
FIG. 7 is a view showing the rear of the seatback when assembly is completed according to the process of FIG. 4, and illustrating a state in which the cover mounting part is sealed while an anchor part is exposed.

As shown in FIG. 7, the anchor part 17 is exposed to the rear of the seatback 1 so that the top tether 15 of the car seat 13 is fixed thereto. Since the anchor part should be exposed to the central portion of the cover 7, it is formed in a shape crossing the central portion of the cover mounting part 9.

The second wire 19 has, on both ends of the straight portion 21 forming the anchor part 17, middle bending portions 23 that extend along the periphery of the cover mounting part 9. The middle bending portion 23 is spaced apart from the cover mounting part 9.

Thus, the thermal deformation of the second wire 19 due to a change in temperature is absorbed through the middle bending portion 23, so that the anchor part 17 may maintain a stable state. The second wire is spaced apart from the cover mounting part 9 by a predetermined interval, so it is not interfered with the cover 7 when it is mounted on the cover mounting part 9.

In the first embodiment and the second embodiment, the closed curve forming the cover mounting part 9 of the first wire 11 has on upper, lower, left, and right sides thereof straight sections 25 to which the cover 7 is coupled.

Further, the cover 7 has, on an outside of a pocket portion 27 inserted into the cover mounting part 9, a plurality of locking ribs 29 that are caught by the cover mounting part 9, and has, on a central portion of the pocket portion 27, an anchor insert portion 31 into which the anchor part 17 of the second wire 19 is inserted.

Thus, the locking ribs 29 of the cover 7 may be coupled to the straight sections 25 of the cover mounting part 9. As a particular example, the coupling may be made as illustrated in FIG. 5.

Some of the locking ribs 29 formed on the pocket portion 27 of the cover 7 are formed on cantilever-shaped elastic pieces 33 that are integrally connected at first ends thereof to the pocket portion 27, so as to be elastically deformed into the pocket portion 27 when the cover 7 is mounted on the cover mounting part 9.

Figure 5:
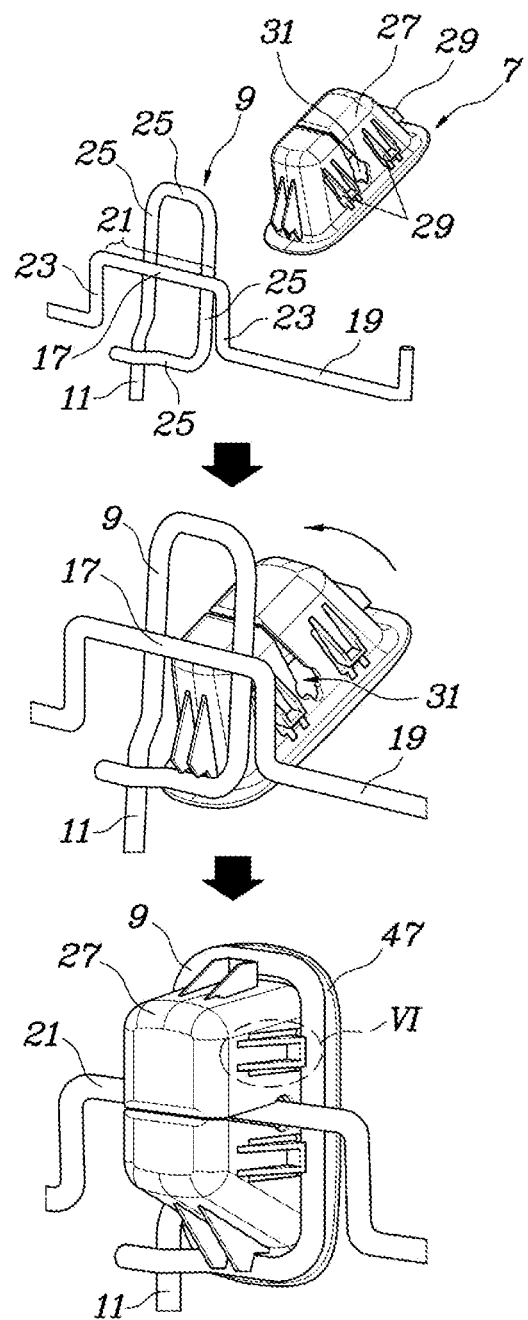
FIG. 5 is a view illustrating a process of mounting a cover on a cover mounting part in FIG. 4.
Figure 6:
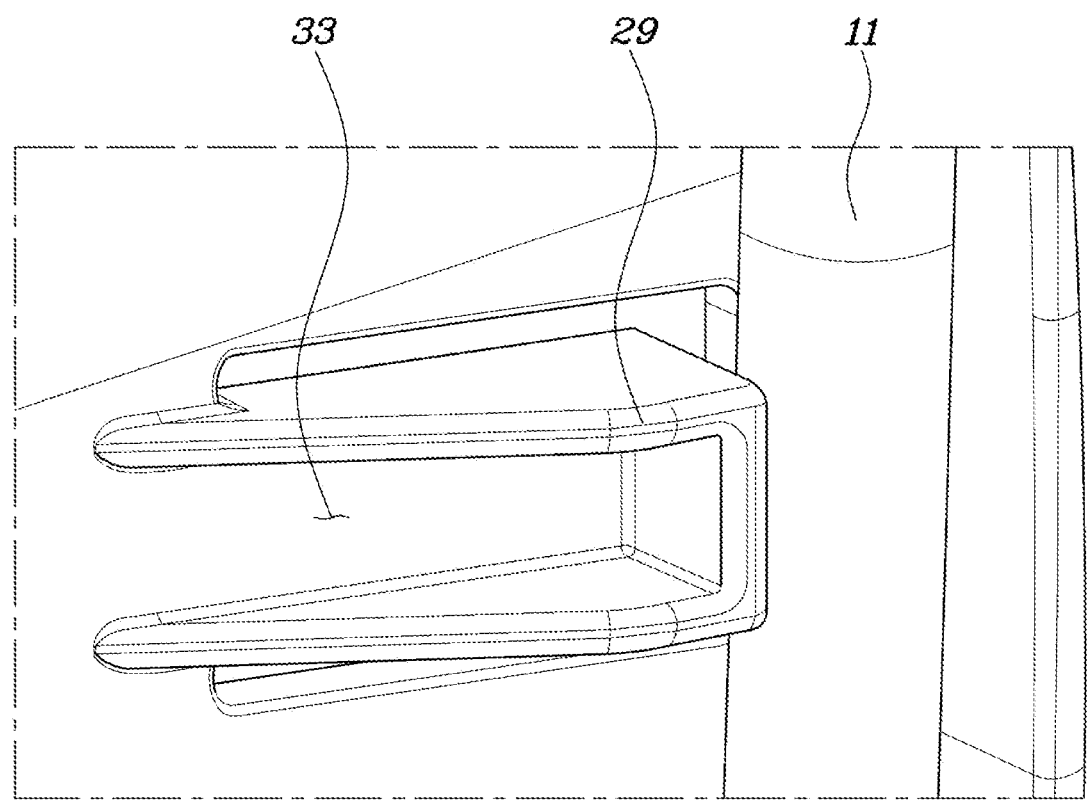
FIG. 6 is a detailed view showing portion VI of FIG. 5.

Thus, as shown in FIG. 5, the locking ribs 29 provided on the lower or upper side of the cover 7 are first caught by the cover mounting part 9, and then the cover 7 is rotated relative to the cover mounting part 9 so that the remaining locking ribs 29 are caught by the cover mounting part 9, thus allowing the cover 7 to be simply and firmly assembled.

Here, as shown in the drawing, the locking ribs 29 formed on the side of the pocket portion 27 or the upper locking rib 29 have a structure formed on the elastic piece 33, thus allowing the cover 7 to be more smoothly assembled.

For reference, the anchor insert portion 31 of the cover 7 is formed in the shape of a slit, so that the anchor part 17 may be inserted into the anchor insert portion 31 by the elastic deformation of the cover 7 made of a plastic resin material.

Figure 3:
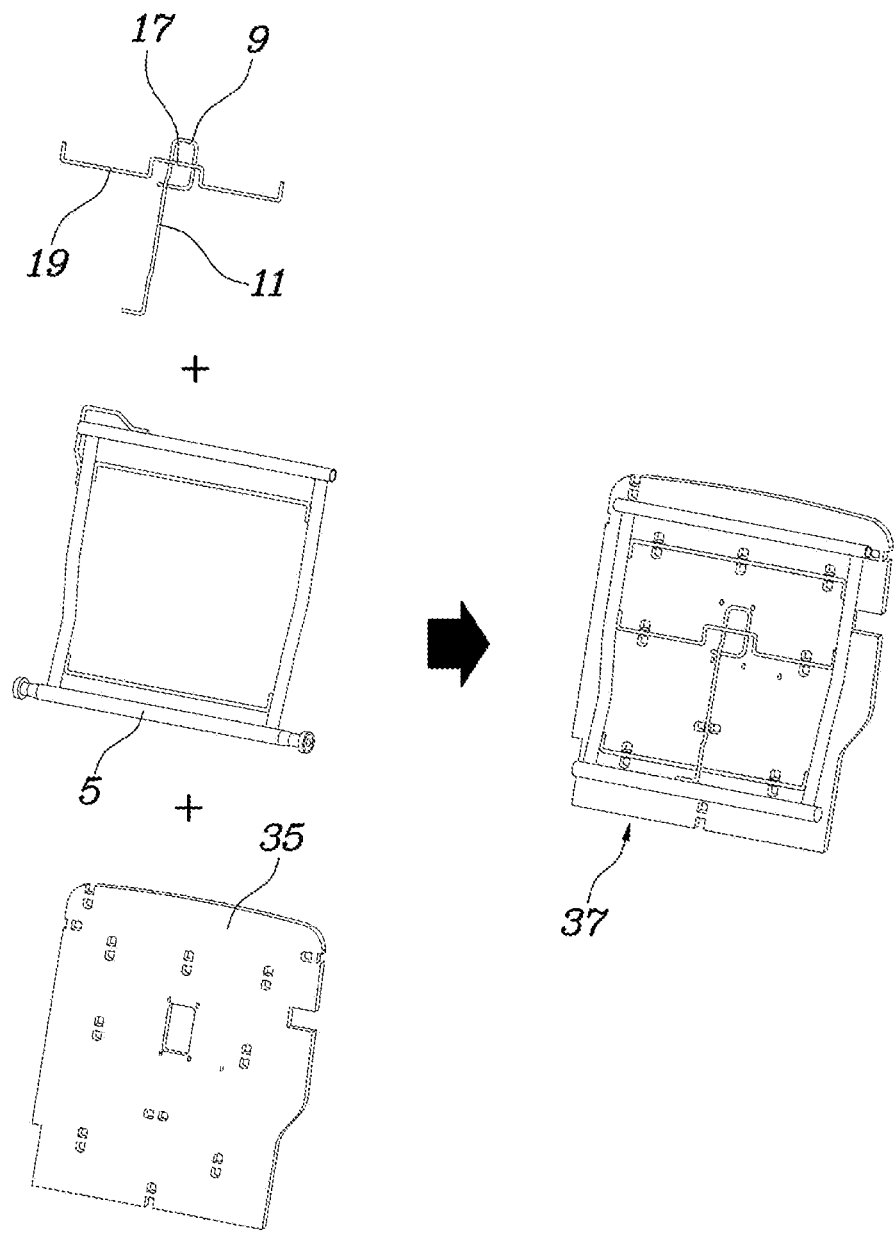
FIGS. 3 and 4 are views illustrating the process of assembling the seatback to which the present disclosure is applied.
Figure 4:
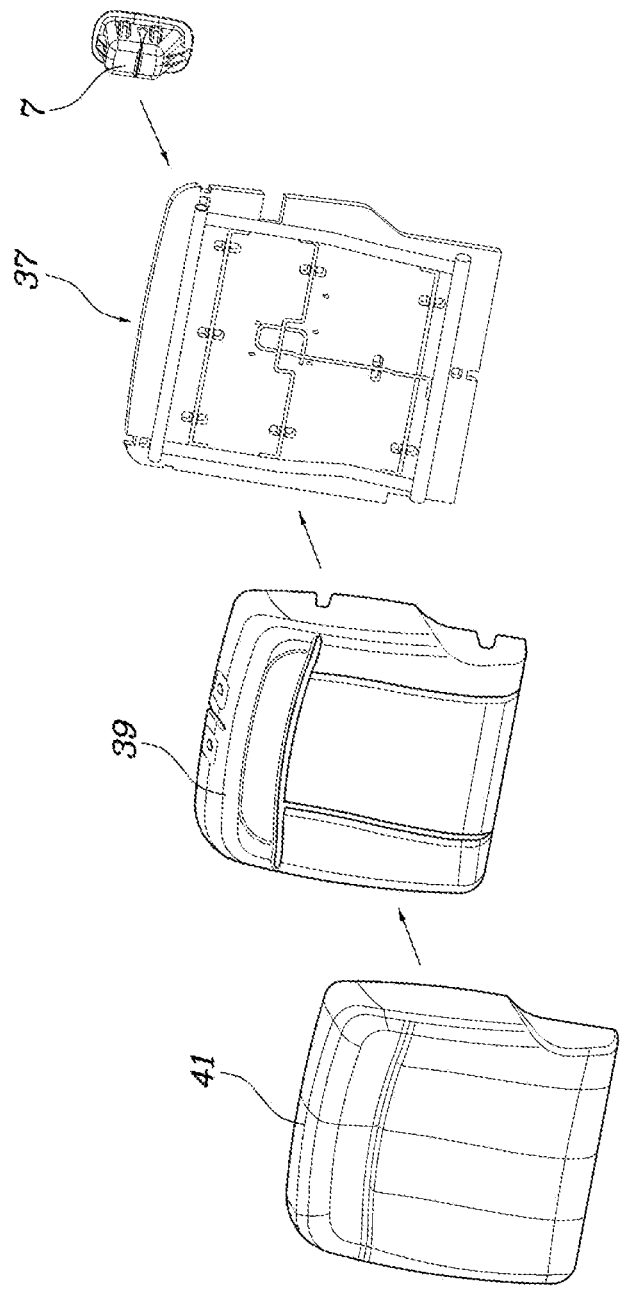

The process of assembling the seatback 1 to which the present disclosure is applied will be described. After the first wire 11 and the second wire 19 are fixed to the seatback frame 5 by welding or the like and then it is fixed to a back board 35 with wires or the like to form an integrated back frame assembly 37, as shown in FIG. 3, a pad 39 and a covering 41 are coupled at the front of a back frame assembly 37 to form the front portion of the seatback 1, and the cover 7 is coupled to the rear of the back frame assembly, as shown in FIG. 4.

Figure 8:
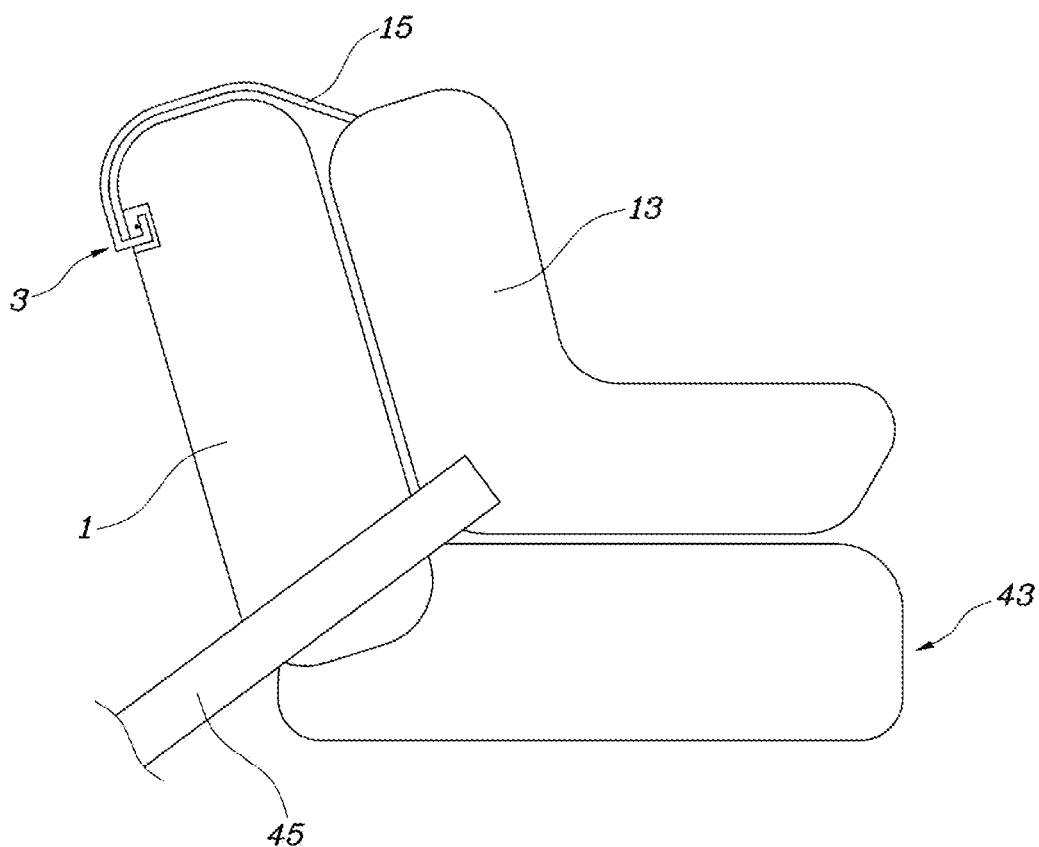
FIG. 8 is a view illustrating the fixing of a top tether of a car seat to the seatback having the tether anchor according to the present disclosure.

FIG. 8 illustrates an example of using the present disclosure. The top tether 15 provided on the upper side of the car seat 13 placed on the seat 43 is fixed to the anchor part 17 of the tether anchor 3 exposed to the rear of the seatback 1, so that the upper side of the car seat 13 is fixed, and the lower side of the car seat 13 is fixed to a vehicle body via a separate lower tether 45, thereby enabling an infant or a child to sit on the car seat 13 in a state where the car seat 13 is firmly fixed.

As described above, in the first embodiment, the first wire 11 is fixed at the lower end thereof to the seatback frame 5. In the second embodiment, both the upper and lower ends of the first wire 11 are fixed to the seatback frame 5.

Thus, the first wire 11 of the second embodiment may be relatively more firmly fixed to the seatback frame 5.

Further, according to the third embodiment, the cover mounting part 9 of the first wire 11 is formed in the shape of an inverted U, and both ends of the inverted U shape are fixed to the seatback frame 5.

Therefore, compared to the first embodiment, the third embodiment allows the first wire 11 to be more firmly fixed to the seatback frame 5, but may slightly reduce a force for fixing the cover 7 by the cover mounting part 9.

The above-mentioned present disclosure may be expressed as follows.

That is, the tether anchor 3 of the seatback 1 according to the embodiments of the present disclosure include the first wire 11 that forms the cover mounting part 9 surrounded by at least three sides among four sides forming the closed curve and is fixed in at least one end thereof to the seatback frame 5, the second wire 19 that has the anchor part 17 crossing the cover mounting part 9 and is fixed at both ends thereof to the seatback frame 5, and the cover 7 that is mounted on the cover mounting part 9, seals to prevent the cover mounting part 9 from being exposed to the outside of the seatback 1, and is formed to expose the anchor part 17.

The first wire 11 is vertically installed on the seatback frame 5, and is fixed in at least a lower end thereof to the seatback frame 5. The second wire 19 is horizontally installed on the seatback frame 5, and both ends thereof are fixed to both sides of the seatback frame 5, respectively.

The pocket portion 27 inserted into the cover mounting part 9 is formed in the central portion of the cover 7. A flange portion 47 is formed along the outer edge of the pocket portion 27 to surround the rear of the cover mounting part 9. The plurality of locking ribs 29 are provided on the outer surface of the pocket portion 27 to be secured to the cover mounting part 9. The anchor insert portion 31 is formed in the central portion of the pocket portion 27 so that the anchor part 17 of the second wire 19 is inserted therein.

At least some of the locking ribs 29 provided on the pocket portion 27 of the cover 7 may be formed on the cantilever-shaped elastic pieces 33 that are integrally connected at first ends thereof to the pocket portion 27, so as to be elastically deformed into the pocket portion 27 when the cover 7 is mounted on the cover mounting part 9.

The second wire 19 has, on both ends of the straight portion 21 forming the anchor part 17, middle bending portions 23 that extend downwards while being spaced apart from the periphery of the cover mounting part 9.

Although the present disclosure was provided above in relation to specific embodiments shown in the drawings, it is apparent to those skilled in the art that the present disclosure may be changed and modified in various ways without departing from the scope of the present disclosure, which is described in the following claims.

What is claimed is:

1. A tether anchor of a seatback of a vehicle seat, the tether anchor comprising:
    a first wire fixed in at least a first end of the first wire to a seatback frame, and forming a cover mounting part for fixing a cover;
    a second wire fixed at both ends of the second wire to the seatback frame, and forming an anchor part for fixing a top tether of a car seat while crossing the cover mounting part of the first wire; and
    a cover mounted on the cover mounting part.

2. The tether anchor of claim 1, wherein the cover is mounted on the cover mounting part so as to expose the anchor part to a rear of the seatback.

3. The tether anchor of claim 2, wherein the cover is configured to seal the rear of the seatback.

4. The tether anchor of claim 1, wherein the cover mounting part of the first wire forms a closed curve.

5. The tether anchor of claim 4, wherein the anchor part of the second wire is formed by a straight portion that crosses a central portion of the cover mounting part forming the closed curve.

6. The tether anchor of claim 5, wherein the second wire comprises, on both ends of the straight portion forming the anchor part, middle bending portions that extend along a periphery of the cover mounting part, and
    the middle bending portion is spaced apart from the cover mounting part.

7. The tether anchor of claim 5, wherein the closed curve forming the cover mounting part of the first wire comprises on upper, lower, left, and right sides of the cover mounting part straight sections to which the cover is coupled.

8. The tether anchor of claim 7, wherein the cover comprises, on an outside of a pocket portion inserted into the cover mounting part, a plurality of locking ribs that are caught by the cover mounting part, and comprises, on a central portion of the pocket portion, an anchor insert portion into which the anchor part of the second wire is inserted.

9. The tether anchor of claim 8, wherein some of the locking ribs formed on the pocket portion of the cover are formed on cantilever-shaped elastic pieces that are integrally connected at first ends of the elastic pieces to the pocket portion, so as to be elastically deformed into the pocket portion when the cover is mounted on the cover mounting part.

10. The tether anchor of claim 1, wherein the first wire is fixed at a lower end of the first wire to the seatback frame.

11. The tether anchor of claim 1, wherein both upper and lower ends of the first wire are fixed to the seatback frame.

12. The tether anchor of claim 1, wherein the cover mounting part of the first wire is formed in a shape of an inverted U, and both ends of the inverted U shape are fixed to the seatback frame.

13. A vehicle seat comprising the tether anchor of claim 1.

14. A vehicle comprising the tether anchor of claim 1.

15. A tether anchor of a seatback of a vehicle seat, the tether anchor comprising:
    a first wire forming a cover mounting part surrounded by at least three sides among four sides forming a closed curve, and fixed in at least a first end of the first wire to the seatback frame;
    a second wire including an anchor part crossing the cover mounting part, and fixed at both ends of the second wire to the seatback frame; and
    a cover mounted on the cover mounting part.

16. The tether anchor of claim 15, wherein cover is configured to seal the cover mounting part to prevent the cover mounting part from being exposed to an outside of the seatback, so as to expose the anchor part.

17. The tether anchor of claim 15, wherein the first wire is vertically installed on the seatback frame, and is fixed in at least a lower end of the first wire to the seatback frame, and
    the second wire is horizontally installed on the seatback frame, and both ends of the second wire are fixed to both sides of the seatback frame, respectively.

18. The tether anchor of claim 16, wherein a pocket portion inserted into the cover mounting part is formed in a central portion of the cover,
    a flange portion is formed along an outer edge of the pocket portion to surround a rear of the cover mounting part,
    a plurality of locking ribs are provided on an outer surface of the pocket portion to be secured to the cover mounting part, and
    an anchor insert portion is formed in a central portion of the pocket portion so that the anchor part of the second wire is inserted therein.

19. The tether anchor of claim 18, wherein at least some of the locking ribs provided on the pocket portion of the cover are formed on cantilever-shaped elastic pieces that are integrally connected at first ends of the elastic pieces to the pocket portion, so as to be elastically deformed into the pocket portion when the cover is mounted on the cover mounting part.

20. The tether anchor of claim 18, wherein the second wire comprises, on both ends of a straight portion forming the anchor part, middle bending portions that extend downwards while being spaced apart from a periphery of the cover mounting part.

* * * * *